United States Patent
Leimkühler et al.

(10) Patent No.: US 10,899,185 B2
(45) Date of Patent: Jan. 26, 2021

(54) CHASSIS ARM WITH DAMPER CONNECTION SECTION AND METHOD FOR PRODUCTION OF A CHASSIS ARM

(71) Applicant: Autotech Engineering Deutschland GmbH, Bielefeld (DE)

(72) Inventors: Leslie Leimkühler, Bielefeld (DE); Udo Wächter, Wallenhorst (DE)

(73) Assignee: Autotech Engineering Deutschland GmbH, Bielefeld (DE)

(*) Notice: Subject to any disclaimer, the term of this patent is extended or adjusted under 35 U.S.C. 154(b) by 0 days.

(21) Appl. No.: 16/353,371

(22) Filed: Mar. 14, 2019

(65) Prior Publication Data
US 2019/0291522 A1 Sep. 26, 2019

(30) Foreign Application Priority Data
Mar. 21, 2018 (EP) .................................. 18163135

(51) Int. Cl.
*B60G 7/00* (2006.01)
*B60G 13/00* (2006.01)

(52) U.S. Cl.
CPC ........... *B60G 7/001* (2013.01); *B60G 13/005* (2013.01); *B60G 2204/129* (2013.01); *B60G 2206/11* (2013.01); *B60G 2206/16* (2013.01); *B60G 2206/811* (2013.01); *B60G 2206/8103* (2013.01); *B60G 2206/91* (2013.01)

(58) Field of Classification Search
CPC .................. B60G 7/001; B60G 13/005; B60G 2204/129; B60G 2206/16; B60G 2206/722; B60G 2206/91; B60G 2206/11; B60G 2206/8103; B60G 2206/811
See application file for complete search history.

(56) References Cited

U.S. PATENT DOCUMENTS

| 9,090,138 B2 * | 7/2015 | Haselhorst | B60G 7/001 |
| 9,895,947 B2 * | 2/2018 | Meyer | B60G 11/16 |

FOREIGN PATENT DOCUMENTS

| DE | 102005013374 A1 | 10/2006 | |
| DE | 102006032595 A1 * | 1/2008 | B60G 7/001 |
| DE | 102006051609 A1 | 5/2008 | |
| DE | 102010023539 A1 * | 12/2011 | B60G 11/16 |

(Continued)

OTHER PUBLICATIONS

Machine language translation of WO 200023871 A obtained from www.espacenet.com on Jul. 21, 2020.*

*Primary Examiner* — Ruth Ilan
(74) *Attorney, Agent, or Firm* — The Webb Law Firm (57) ABSTRACT

The invention relates to a chassis arm for a motor vehicle, having a first end section for connection to a chassis support, a second end section for connection at a wheel end, and a damper connection section exhibiting at least one bearing eye for connecting a damper. The bearing eye is assigned at least one installation aid with a support surface for the damper. The installation aid is formed integrally with the chassis arm, wherein the installation aid in the form of a tab is cut free from the base material of the chassis arm and converted to a body section of the chassis arm, and wherein at least a part of the tab is designed as a support surface for the damper. The invention also relates to a method for producing a chassis arm, in particular a spring control arm for a motor vehicle.

14 Claims, 4 Drawing Sheets

(56) References Cited

FOREIGN PATENT DOCUMENTS

| DE | 102013222234 | A1 |   | 4/2015  |           |
|----|--------------|----|---|---------|-----------|
| DE | 102015210151 | A1 |   | 12/2016 |           |
| DE | 102017215112 | A1 | * | 2/2019  | B60G 7/001 |
| WO | WO-2011023871 | A1 | * | 3/2011  | B60G 11/16 |
| WO | WO-2012104345 | A1 | * | 8/2012  | B60G 11/16 |

* cited by examiner

CHASSIS ARM WITH DAMPER CONNECTION SECTION AND METHOD FOR PRODUCTION OF A CHASSIS ARM

CROSS-REFERENCE TO RELATED APPLICATION

This application claims priority to European Patent Application No. 18163135.9 filed Mar. 21, 2018, the disclosure of which is hereby incorporated by reference in its entirety.

BACKGROUND OF THE INVENTION

The invention relates to a chassis arm, in particular a spring control arm made of formable base material, preferably sheet steel, for a motor vehicle, having a first end section for connection to a chassis support, having a second end section for connection at the wheel end and having a damper connection section with at least one bearing eye for connecting a damper, whereby the bearing eye is assigned at least one installation aid with a support surface for the damper. Furthermore, the invention relates to a method for producing a chassis arm, in particular a spring control arm for a motor vehicle.

Chassis arms, also called control arms or simply A-arms, serve to guide a wheel on a wheel suspension of a motor vehicle. Wheel suspension connects the wheel with the chassis and guides it, granting a certain degree of freedom. Chassis arms can be manufactured or produced, for example, from cast parts or preferably from reshaped (steel) metal sheets.

Spring control arms are chassis arms, which have a section for supporting a damper and/or a suspension element which is itself supported against the body. Dampers are referred to in the prior art also as damper elements or spring damper arrangements. Dampers are connected by means of at least one bearing eye with the chassis arm. The term 'bearing eye' is understood to mean a (through) hole in the damper connection section of the chassis arm, which is suitable for mounting and/or attachment of the damper.

As part of the assembly of a preassembled chassis to the body, a damper already connected to the body is usually mounted on the damper connection section of the chassis arm. For this purpose, the damper is connected by means of a bolt with the damper connection section of the chassis arm having at least one bearing eye.

So that the damper can perform its intended function, this is mounted under a certain preload. Usual preloads of such a damper element can exert pressure forces of up to 10 kN on the chassis arm or the damper connection section of the chassis arm.

In order that the damper can reliably be screwed onto the at least one bearing eye of the chassis arm, in spite of these high contact pressures, a method known from the prior art involves providing a so-called installation aid having a support surface for the damper. With the aid of the support surface, the damper can first be centred on the chassis arm, then set under the desired preload and finally secured with a bolt on the at least one bearing eye of the chassis arm.

From the prior art, a method is known involving provision of said support surface for a damper with the aid of a damper stopper, which is attached to the chassis arm in a separate process step. For example, a damper stopper is welded using four welding points on the chassis arm in the region of the bearing eye, so that the support surface defined by the damper stopper is attached to the bearing eye. The realisation of the installation aid by welding an additional element in the form of the damper stopper caused additional material costs and significant process costs, in particular costs for welding. Furthermore, there is sometimes the risk that the additional element loosens when the weld has been performed poorly and/or is affected by corrosion.

On this basis, the present invention seeks to provide a chassis arm of the type mentioned, whose installation aid can be produced in a process-reliable and cost-effective manner.

SUMMARY OF THE INVENTION

This object is achieved by a chassis arm with the features specified in the present disclosure. Preferred and advantageous designs of the chassis arm according to the invention are also specified in the present disclosure.

The chassis arm, in particular a spring control arm made of formable base material, preferably sheet steel, for a motor vehicle, having a first end section for connection to a chassis support, having a second end section for connection at the wheel end and having a damper connection section with at least one bearing eye for connecting a damper, whereby the bearing eye is assigned at least one installation aid with a support surface for the damper, characterised in that the installation aid is formed integrally with the chassis arm, wherein the installation aid is cut free in the form of a tab from the base material of the chassis arm and converted to a body section of the chassis arm, and wherein at least a part of the tab is designed as a support surface for the damper. The damper may be a separate damper or a damper combined with a coil spring that is a so-called spring damper system.

The tab can be cut free with relatively little effort from the base material of the chassis arm, so that the support surface of the installation aid can be provided in a technically favourable manner by the tab. Compared to the conventional solution, in which an additional component is welded as a stop, the usual welding process is eliminated in the inventive solution. As a result, manufacturing costs can be saved. Also, costs are saved in the inspection of the chassis arm, since there are no welding points that need to be examined or inspected in the context of a quality inspection.

However, it is also within the scope of the invention to weld the converted tab onto the adjacent leg of the trough-shaped chassis arm. As a result, if necessary, the strength of the converted tab can be improved. Such a welded joint of the converted tab is then preferably designed as a point-shaped welded joint.

Furthermore, material costs are saved by eliminating the separately produced installation aid, to be welded as an additional component to the chassis arm. In the solution according to the invention, however, the installation aid is made from the already existing base material of the chassis arm, so that no additional material costs are incurred for the installation aid.

In addition, the solution according to the invention is distinguished from the installation aids known from the prior art, which are welded as additional parts to the chassis arm, by avoiding corrosion problems. The reason for this is that, in the case of a welded-on installation aid, there is usually a gap between the installation aid and the chassis arm. This gap is particularly susceptible to corrosion. Even when applying corrosion protection, there is no guarantee that the entire gap will be filled with corrosion protection. In the solution according to the invention, however, a corrosion-prone gap is avoided.

For the realisation of the solution according to the invention, it is possible in particular to cut free the tab serving as an installation aid in a stamping press and convert it in a forming tool, which is in any case required for the production of the chassis arm from formable base material, preferably sheet steel. Preferably, the support surface of the tab is finished after the conversion step. For this purpose, a fine blanking or calibrating of the support surface of the tab can be provided, whereby the position accuracy and concentricity of the support surface to the at least one bearing eye is increased. The support surface provided by the tab for the damper can also be referred to as damper stop.

In an advantageous embodiment of the invention, the support surface is formed primarily in the form of a circular arc or an elliptical arc. As a result, the damper can be very conveniently and reliably aligned or centred on the chassis arm, so that the damper can be placed under preload and connected to the bearing eye.

A further preferred embodiment of the invention is characterised in that one end face of the tab or at least part of the end face of the tab forms the support surface. It is preferred that the end face of the tab next to the support surface has two edge sections bounding the support surface, preferably substantially mutually parallel. As a result, an increased strength of the support surface of the tab can be ensured, so that the damper can be set during assembly under a high preload or preload force, without resulting in the yielding of the tab acting as an installation aid.

Furthermore, it is preferred that the tab has a converted section which serves as a support surface for the damper. The converted section can be converted either in the direction of the bearing eye or in the opposite direction. The support surface for the damper for mounting it on the chassis arm is increased by the converted section. As a result, the forces required for preloading the damper can be transmitted more uniformly and more reliably to the damper via the tab by means of the chassis arm.

In order that the damper to be mounted is optimally aligned relative to the bearing eye, it is advantageous if according to a further embodiment of the invention, the support surface is substantially parallel or coaxial with the central axis of the bearing eye.

A further advantageous embodiment of the invention is characterised in that at least the damper connection section of the chassis arm is formed, with the exception of the tab, as a substantially trough-shaped body section comprising a base surface and two legs laterally bounding the base surface, wherein at least one of the legs has the at least one bearing eye. Due to the design of the suspension control arm as a trough-shaped body, which has two legs, the functionalities of a chassis arm of the type in question, in particular a spring control arm with a shock absorber connection, can be provided in a structurally favourable manner with relatively low component weight.

Preferably, the tab bounds a recess formed in the base surface of the trough-shaped body section of the chassis arm, wherein the tab is converted to be substantially parallel to the leg of the chassis arm having the bearing eye. A recess in the form of a window-like cut out can reduce the weight of a chassis arm. Such a recess can be provided, for example, in the base surface of a trough-shaped chassis arm, in particular in the region of the base surface adjacent to the bearing eye.

The area underneath the bearing eye usually has to provide a certain clearance and can normally be considered as punched waste cuttings. This clearance is typically realised by a recess (passage opening). The section of the base material, preferably sheet steel, which is cut free out of the base material to form the recess, therefore represents waste cuttings. By means of the solution according to the invention, part of this base material, which is actually superfluous as waste cuttings, can be used effectively for the supply of the damper installation aid.

This reduces the material costs and the waste cuttings are minimised, which is also beneficial in ecological terms.

Furthermore, it is preferred that the tab has a distance in the range of greater than 0 to 60 mm, preferably in the range of greater than 0 to 30 mm, to the leg of the chassis arm which has the bearing eye. Due to the above-mentioned distance, a full-surface and thus reliably effective corrosion protection coating of the tab as well as the leg or the legs in the area of the bearing eye is advantageously made possible. The corrosion protection can be applied for example by dip coating or spray coating on the chassis arm.

Particularly preferably, the damper connection section has at least two opposing and mutually aligned bearing eyes, wherein the tab serving as an installation aid is executed twice, in that one such tab with a support surface for the damper is assigned to each of the two bearing eyes. Such an embodiment is advantageous with regard to the centring or positioning properties of the damper during assembly. In particular, this reduces the force exerted on the tab during the connection of the damper by distributing the force between two tabs, thereby improving the process reliability of the damper centring in the chassis-mounted chassis arm assembly. With regard to the damper centring during the assembly of the chassis arm, it is particularly preferable that the two converted tabs are mutually mirror symmetrical. Furthermore, it is preferred that the chassis arm is designed to be substantially mirror symmetrical overall.

The chassis arm according to the invention is preferably designed as single-layer sheet metal component.

The above object of the present invention is also achieved by a method for producing a chassis arm having the features specified in the present disclosure.

The method according to the invention comprises the following features or steps:
  sheet metal, preferably sheet steel, cut to a blank,
  at least one bearing eye for connecting a damper and at least one recess are cut into the sheet metal before, during or after the cutting of the blank,
  the recess is cut out such that at least one tab is cut free through the recess,
  the blank is formed into a trough-shaped component, having a base surface and two legs laterally adjoining the base surface, so that the bearing eye is arranged in one leg and the recess is arranged in the base surface, and
  after cutting out the recess and converting the trough-shaped component, the at least one tab is converted in such a way that a part of the tab serves as a support surface for a damper to be connected to the bearing eye.

The advantages of such a method correspond to the advantages mentioned above in connection with the chassis arm according to the invention.

In a preferred embodiment of the method according to the invention, the support surface is finely punched or calibrated after the conversion step, so that the positional accuracy and concentricity of the support surface to the at least one bearing eye is increased.

A further preferred embodiment of the method is characterised in that the tab is converted with respect to the recessed base surface of the trough-shaped component with a conversion angle in the range of 85° to 95°, preferably with a conversion angle of primarily 90°.

In this way, a support surface can be provided in an advantageous manner, which runs substantially parallel or coaxial with the central axis of the bearing eye.

According to a further preferred embodiment of the method, the tab is reshaped so that it has a flanged support surface as a support surface for the damper. A flanged support surface leads to an advantageous centring of the damper during assembly. In particular, a larger force transmission surface is provided by a flanged support surface.

According to a further advantageous embodiment of the method, the tab is converted such that it has a distance in the range of greater than 0 to 60 mm, preferably in the range of greater than 0 to 30 mm, to the leg of the chassis arm which has the bearing eye.

A further embodiment of the method is characterised in that the converted tab is welded to the adjacent leg of the trough-shaped chassis arm, wherein this welded connection is preferably designed as a point-shaped welded connection.

The invention will subsequently be explained in more detail with reference to a drawing depicting exemplary embodiments. This shows:

BRIEF DESCRIPTION OF THE DRAWINGS

FIG. 4b a second embodiment of a trough-shaped chassis arm in a cross-sectional view similar to the cross-sectional view in FIG. 4a; and FIG. 4c a third embodiment of a trough-shaped chassis arm in a cross-sectional view similar to the cross-sectional view in FIG. 4a.

DESCRIPTION OF THE INVENTION

Figure 1:
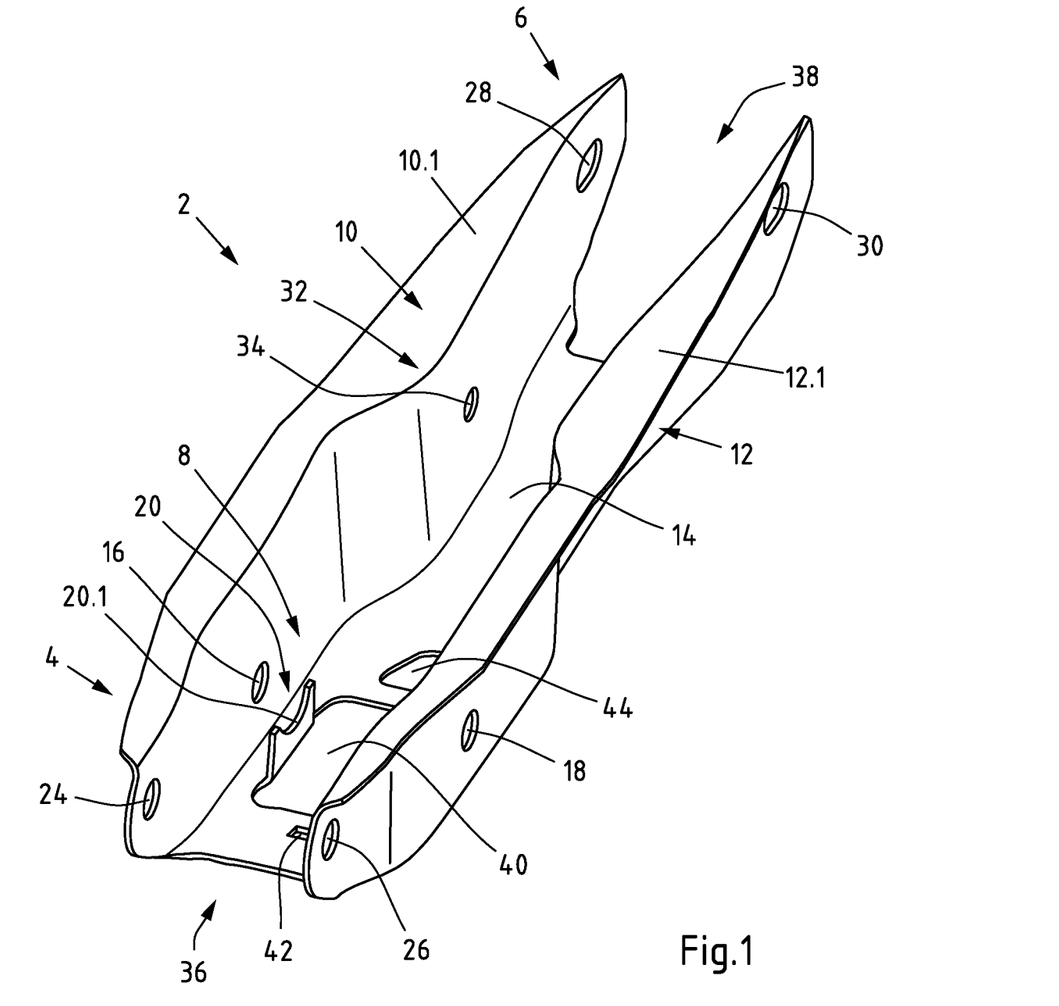
FIG. 1 a perspective view of a first exemplary embodiment of a trough-shaped chassis arm.

FIG. 1 shows a chassis arm 2 for a motor vehicle. The chassis arm 2 can also be referred to as a spring control arm or symbolically represents a spring control arm. The chassis arm 2 is made of a metal blank, which is formed into a substantially trough-shaped body. The chassis arm 2 has a first end section for connection to a wheel carrier and a second end section for connection to a chassis support. Between the two end sections 4 and 6, a damper connection section 8 is arranged for connection of a damper.

The chassis arm 2 also comprises high-strength sheet metal, preferably sheet steel. The sheet metal or sheet steel used for its production preferably has a yield strength of more than 650 MPa. Particularly preferable is multiphase or complex phase steel which has, for example, a tensile strength of at least 800 MPa and a yield strength of at least 680 MPa. The sheet thickness of the chassis arm 2 is for example in the range of 1 to 4 mm, preferably in the range of 1.5 to 3 mm.

The substantially trough-shaped chassis arm 2 has two legs 10 and 12 which bound a base surface 14 of the trough body.

In the region of the damper connection section 8, the legs 10 and 12 have two aligned bearing eyes 16 and 18 in the form of through holes. The bearing eyes 16 and 18 are preferably realised as circular through holes. The bearing eyes 16 and 18 serve to connect the damper to the chassis arm 2. The bearing eyes 16 and 18 are each assigned an installation aid designed in the form of a converted tab 20 and 22. In this case, the tabs 20 and 22 extend substantially parallel to the legs 10 and 12 of the trough-shaped chassis arm 2. At their end faces or ends, the tabs 20 and 22 each have a support surface 20.1 and 22.1, whereby the support surfaces 20.1 and 22.1 are preferably bounded laterally by substantially mutually parallel edge sections 20.2 and 22.2 (see in particular FIG. 3). The edge sections 20.2 and 22.2 terminate at the end face of the tabs 20 and 22 respectively, in the form of substantially rectilinear edges, whereby these edges border the support surface 20.1 or 22.1 respectively. The support surface 20.1 or 22.1 is formed substantially in the form of an elliptical arc in the embodiment of the chassis arm 2 shown in FIGS. 1 to 3. Alternatively, the support surface 20.1 or 22.1 may each be in the form of a circular arc. The respective support surface 20.1 or 22.1 can also be referred to as concave edge or concave damper stop. The substantially rectilinear edges of the edge sections 20.2 and 22.2 of the respective tab 20 lie, for example, on a common alignment line.

The legs 10 and 12 of the chassis control arm 2 run continuously from the first end section 4, with which the suspension link 2 can be connected to a wheel carrier, to the second end section 6, with which the chassis arm 2 can be connected to a chassis support, such as a rear axle. The first end section 4 is fork-shaped and has two mutually aligned through holes 24 and 26.

The second end section 6 is also fork-shaped and has mutually aligned slots 28 and 30, which serve to connect the chassis arm 2 to a chassis support.

Between the second end section 6 and the damper connection section 8, a narrowed intermediate section 32 is formed, in which the distance between the two legs 10 and 12 is less than at the two end sections 4 and 6 and at the damper connection section 8. The intermediate section 32 of the chassis arm 2 has two mutually aligned through holes 34, on which further components can be connected with the chassis arm 2.

The legs 10 and 12 of the trough-shaped body have on their surface a flange or collar 10.1, 12.1 which is bent outwards. These collars 10.1, 12.1 are each designed continuously between the two end sections 4 and 6. The width of the collars 10.1 and 12.1 changes along the legs 10, 12. The largest width of the collars 10.1 and 12.1 occurs in the area of the narrowed intermediate section 32. From there, the width of the collars 10.1 and 12.1 decreases in the direction of the end sections 4 and 6.

Figure 2:
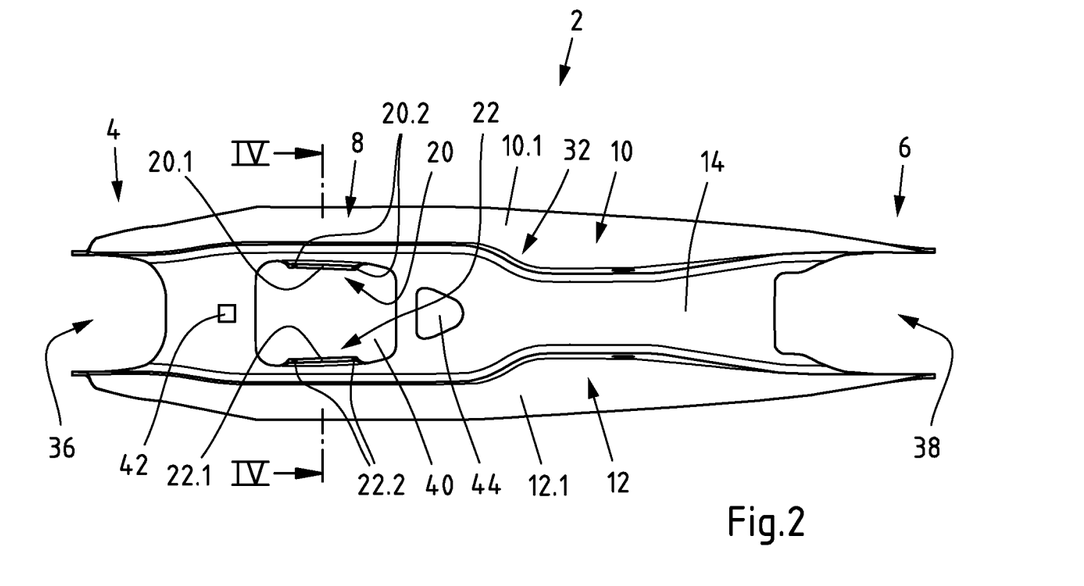
FIG. 2 the chassis arm depicted in FIG. 1 in a plan view.

As can be seen in particular from FIG. 2, the base surface 14 of the chassis arm 2 has niche-like recesses 36 and 38 at the areas associated with the first end section 4 and the second end section 6. In addition, in the base surface 14 of the chassis arm 2, an opening is cut out as a recess 40, which serves to reduce the weight of the chassis arm 2 and the formation of the tabs 20 and 22. Two further openings 42 and 44 introduced into the base surface 14 serve for fastening additional components, as a passage for a fluid line and/or as an access opening for an adjustment means or tool.

Figure 3:
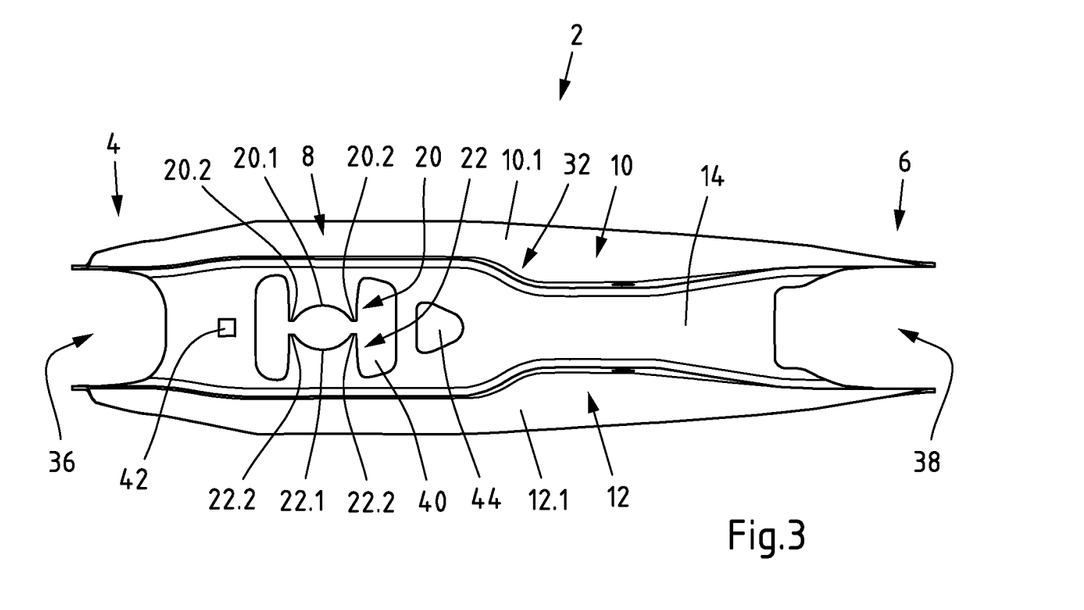
FIG. 3 the chassis arm from FIGS. 1 and 2 before conversion of the cut free tabs in a plan view.

In FIG. 3, the chassis arm 2 shown in FIGS. 1 and 2 is shown before the conversion of the tabs cut free in the base surface 14 in plan view.

Figure 4A:
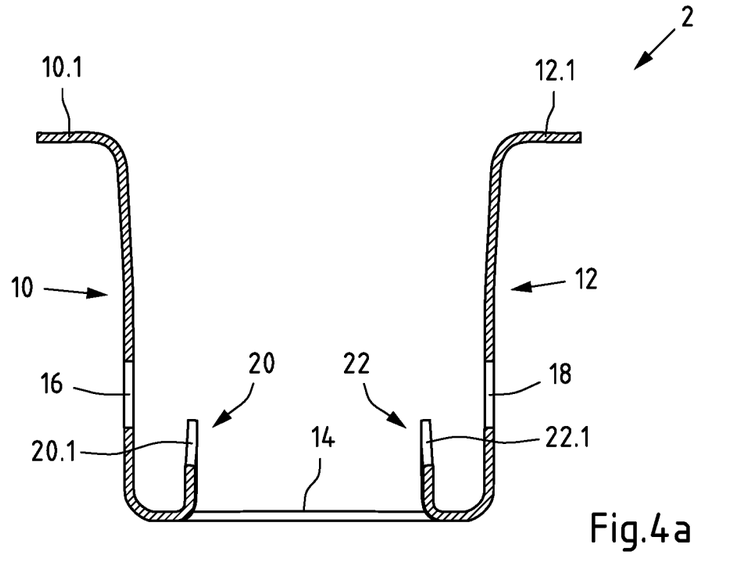
FIG. 4a a cross-sectional view of the chassis arm along the section line A-A in FIG. 2.

It can be seen that the recess 40 is formed in the base surface 14 such that the tabs 20 and 22 perform their desired functionality as installation aids for the damper simply by conversion. The tabs 20 and 22 are preferably converted by an angle of approximately 90° relative to the base surface 14. Such a conversion angle can be inferred in particular from the cross-sectional view of the trough-shaped chassis arm 2 shown in FIG. 4a.

Figure 4B:
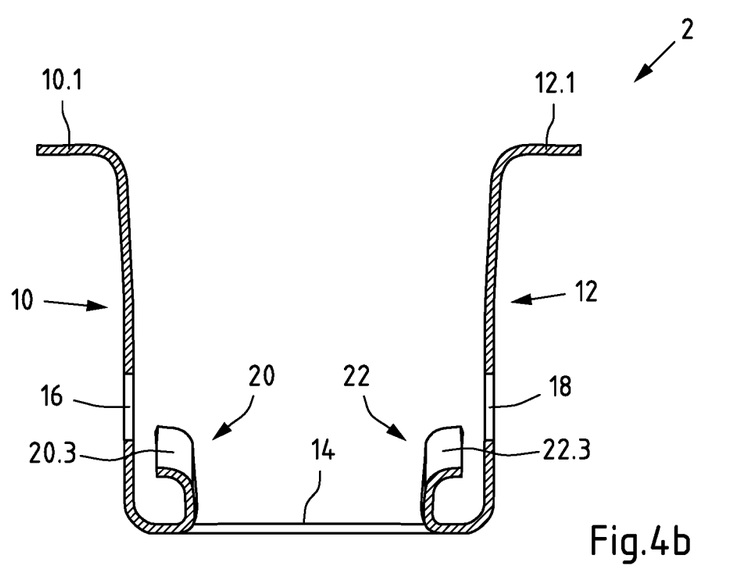

FIG. 4b shows a second exemplary embodiment of the trough-shaped chassis arm 2 in a cross-sectional view. In contrast to the first exemplary embodiment shown in FIGS. 1 to 4a, the tabs 20 and 22 in the second embodiment have converted sections 20.3 and 22.3, which serve as a stop or as support surfaces 20.1 and 22.1 for the damper. The converted sections 20.3 and 22.3 are converted to the outside. Preferably, the converted sections 20.3 and 22.3 are converted outwards with an angle of approximately 90° in relation to the sections of the tabs 20 and 22 extending substantially parallel to the legs 10 and 12.

Figure 4C:
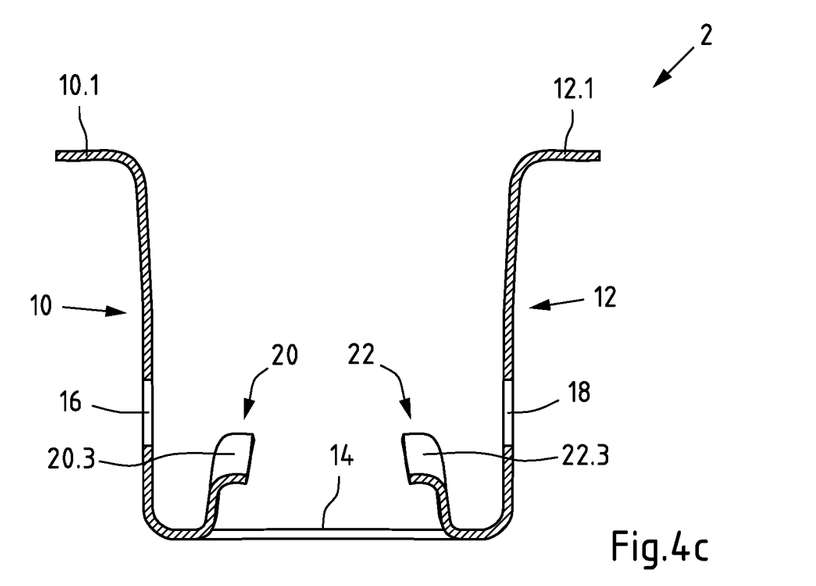

In FIG. 4c, a third embodiment of the trough-shaped chassis arm 2 is shown in cross-sectional view. In contrast to the embodiment shown in FIG. 4b, the tabs 20 and 22 have sections 20.3 and 22.3 converted inwards, which serve as a stop or as support surfaces 20.1 and 22.1 for the damper. It is preferred that the converted sections 20.3 and 22.3 are converted inwards at an angle of approximately 90° with respect to the sections of the tabs 20 and 22 extending parallel to the legs 10 and 12.

The embodiment of the chassis arm according to the invention is not limited to the exemplary embodiments shown in the drawing. On the contrary, numerous variants are conceivable which make use of the invention specified in the claims even in the case of embodiments deviating from described exemplary embodiments. In particular, the support surfaces acting as installation aids can be provided by differently shaped tabs.

The invention claimed is:

1. A chassis arm for a motor vehicle, comprising:
a first end section configured to connect to a chassis support;
a second end section configured to connect at a wheel end; and
a damper connection section having at least one bearing eye for connecting a damper,
wherein the at least one bearing eye is assigned at least one installation aid with a support surface for the damper,
wherein the installation aid is formed integrally with the chassis arm,
wherein the installation aid in the form of a tab is cut free from the base material of the chassis arm and converted to a body section of the chassis arm,
wherein at least one section of the tab is configured to be the support surface for the damper, and
wherein at least an end face of the tab or a part of the end face of the tab forms the support surface.

2. A chassis arm according to claim 1, wherein the support surface is in the form of a circular arc or an elliptical arc.

3. A chassis arm according to claim 1, wherein the end face of the tab next to the support surface comprises two edge sections bounding the support surface.

4. A chassis arm according to claim 1, wherein the tab has a converted section configured to be a support surface for the damper.

5. A chassis arm according to claim 1, wherein the support surface is substantially parallel or coaxial to a central axis of the at least one bearing eye.

6. A chassis arm according to claim 1, wherein the damper connection section comprises at least two bearing eyes opposite and aligned with one another, wherein each of the two bearing eyes is assigned a tab having a support surface allocated to the damper.

7. A chassis arm according to claim 6, wherein the two tabs are configured to be mutually mirror symmetrical.

8. A chassis arm for a motor vehicle, comprising:
a first end section configured to connect to a chassis support;
a second end section configured to connect at a wheel end; and
a damper connection section having at least one bearing eye for connecting a damper,
wherein the at least one bearing eye is assigned at least one installation aid with a support surface for the damper,
wherein the installation aid is formed integrally with the chassis arm,
wherein the installation aid in the form of a tab is cut free from the base material of the chassis arm and converted to a body section of the chassis arm,
wherein at least one section of the tab is configured to be a support surface for the damper, and wherein at least the damper connection section, with the exception of the tab, is a substantially trough-shaped body comprising a base surface and two legs laterally bounding the base surface, and when at east one of the legs comprises the at east one bearing eye.

9. A chassis arm according to claim 8, wherein the tab bounds a recess formed in the base surface, and wherein the tab is configured to be converted to be substantially parallel to the leg exhibiting the at least one bearing eye.

10. The chassis arm according to claim 8, wherein the tab is configured to be a distance away from the leg exhibiting the at least one bearing eye, wherein the distance is in the range from greater than 0 to 60 mm.

11. A method for producing a chassis arm, the method comprising:
cutting sheet metal to a blank;
cutting at least one bearing eye for connecting a damper and at least one recess into the sheet metal before, during or after the cutting of the blank; and
cutting out the recess so that at least one tab is cut free through the recess, and
forming the blank into one trough-shaped component;
wherein the at least one bearing eye is configured to connect to a damper, and
wherein the blank formed into one trough-shaped component comprises one base surface and two legs laterally adjoining the base surface, so that the at least one bearing eye is arranged in one leg and the recess is arranged in the base surface, and
wherein after cutting out the recess and shaping the trough-shaped component, the at least one tab is converted such that a part of the tab is configured to serve as a support surface for a damper to be connected to the at least one bearing eye.

12. The method according to claim 11, wherein the at least one tab is arranged in relation to the base surface exhibiting the recess of the trough-shaped component with a conversion angle in the range from 85° to 95°.

13. The method according to claim 11, wherein the at least one tab is configured so that it has a flanged support surface configured to be a support surface for the damper.

14. The method according to claim 11, wherein the at least one tab is configured to be a distance in the range from greater than 0 to 60 mm away from the legs exhibiting the bearing eye.

\* \* \* \* \*

UNITED STATES PATENT AND TRADEMARK OFFICE
CERTIFICATE OF CORRECTION

PATENT NO. : 10,899,185 B2
APPLICATION NO. : 16/353371
DATED : January 26, 2021
INVENTOR(S) : Leslie Leimkühler et al.

Page 1 of 1

It is certified that error appears in the above-identified patent and that said Letters Patent is hereby corrected as shown below:

In the Claims

Column 8, Line 23, Claim 8, delete "when" and insert -- wherein --

Column 8, Line 23, Claim 8, delete "east" and insert -- least --

Column 8, Line 24, Claim 8, delete "east" and insert -- least --

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*